United States Patent
Cowan

(10) Patent No.: US 6,654,982 B1
(45) Date of Patent: Dec. 2, 2003

(54) REARVIEW TRUCK MIRROR AND WIPER ASSEMBLY

(76) Inventor: William Q. Cowan, P.O. Box #627, Fort Nelson BC V0C-1R0 (CA)

( * ) Notice: Subject to any disclaimer, the term of this patent is extended or adjusted under 35 U.S.C. 154(b) by 280 days.

(21) Appl. No.: 09/910,266

(22) Filed: Jul. 20, 2001

(51) Int. Cl.[7] .................................................. B60S 1/60
(52) U.S. Cl. ............................ 15/250.003; 15/250.05; 15/250.29; 359/838; 359/871
(58) Field of Search ...................... 15/250.003, 250.05, 15/250.29; 359/838, 839, 871, 844, 507

(56) References Cited

U.S. PATENT DOCUMENTS

| | | | |
|---|---|---|---|
| 3,855,661 A | * 12/1974 | Prince | 15/250.01 |
| 3,968,537 A | * 7/1976 | Wagenhofer | 15/250.29 |
| 4,212,091 A | * 7/1980 | Jones | 15/250.003 |
| 4,763,381 A | 8/1988 | Williams | |
| D330,002 S | 10/1992 | Forte | |
| 5,436,741 A | * 7/1995 | Crandall | 359/15 |
| 5,446,576 A | 8/1995 | Lynam et al. | |
| 5,634,234 A | * 6/1997 | Allain | 15/250.003 |
| 5,749,118 A | 5/1998 | Holland | |
| 5,760,956 A | 6/1998 | Maccan | |
| D420,315 S | 2/2000 | Hardy | |
| 6,324,718 B1 | * 12/2001 | Johnson | 15/250.003 |
| 6,453,504 B1 | * 9/2002 | Burkard et al. | 15/250.003 |
| 6,530,110 B1 | * 3/2003 | Breau et al. | 15/250.003 |

* cited by examiner

Primary Examiner—Gary K. Graham
(74) Attorney, Agent, or Firm—Clark, Wilson; Michael Roman

(57) ABSTRACT

A rearview truck mirror and wiper assembly for improving the rear view for truckers by keeping the mirror clean and lighted. The rearview truck mirror and wiper assembly includes a first housing assembly including a first housing member having side, top, bottom, and back walls, and also including an open front, and also including a mirror being securely disposed at the open front of the first housing member with the first housing assembly being adapted to be securely mounted to mirror supports on a truck; and also includes a second housing member being attached to the first housing member and having top, bottom, front and side walls; and further includes a wiper drive assembly being disposed in the second housing member and including a track member and a two-directional motor; and also includes a wiper assembly being attached to the wiper drive assembly and including a wiper member being movable upon the mirror; and further includes a heating element being disposed in the first housing member; and also includes a light-emitting assembly also being disposed in the first housing member.

9 Claims, 3 Drawing Sheets

REARVIEW TRUCK MIRROR AND WIPER ASSEMBLY

BACKGROUND OF THE INVENTION

1. Field of the Invention

The present invention relates to truck mirror and wiper assemblies and more particularly pertains to a new rearview truck mirror and wiper assembly for improving the rear view for truckers by keeping the mirror clean and lighted.

2. Description of the Prior Art

The use of truck mirror and wiper assemblies is known in the prior art. More specifically, truck mirror and wiper assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,763,381; 5,446,576; U.S. Pat. No. Des. 420,315; U.S. Pat. Nos. 5,749,118; 5,760,956; and U.S. Pat. No. Des. 330,002.

While these devices fulfill their respective, particular objectives and requirements, the aforementioned patents do not disclose a new rearview truck mirror and wiper assembly. The inventive device includes a first housing assembly including a first housing member having side, top, bottom, and back walls, and also including an open front, and also including a mirror being securely disposed at the open front of the first housing member with the first housing assembly being adapted to be securely mounted to mirror supports on a truck; and also includes a second housing member being attached to the first housing member and having top, bottom, front and side walls; and further includes a wiper drive assembly being disposed in the second housing member and including a track member and a two-directional motor; and also includes a wiper assembly being attached to the wiper drive assembly and including a wiper member being movable upon the mirror; and further includes a heating element being disposed in the first housing member; and also includes a light-emitting assembly also being disposed in the first housing member.

In these respects, the rearview truck mirror and wiper assembly according to the present invention substantially departs from the conventional concepts and designs of the prior art, and in so doing provides an apparatus primarily developed for the purpose of improving the rear view for truckers by keeping the mirror clean and lighted.

SUMMARY OF THE INVENTION

In view of the foregoing disadvantages inherent in the known types of truck mirror and wiper assemblies now present in the prior art, the present invention provides a new rearview truck mirror and wiper assembly construction wherein the same can be utilized for improving the rear view for truckers by keeping the mirror clean and lighted.

The general purpose of the present invention, which will be described subsequently in greater detail, is to provide a new rearview truck mirror and wiper assembly which has many of the advantages of the truck mirror and wiper assemblies mentioned heretofore and many novel features that result in a new rearview truck mirror and wiper assembly which is not anticipated, rendered obvious, suggested, or even implied by any of the prior art truck mirror and wiper assemblies, either alone or in any combination thereof.

To attain this, the present invention generally comprises a first housing assembly including a first housing member having side, top, bottom, and back walls, and also including an open front, and also including a mirror being securely disposed at the open front of the first housing member with the first housing assembly being adapted to be securely mounted to mirror supports on a truck; and also includes a second housing member being attached to the first housing member and having top, bottom, front and side walls; and further includes a wiper drive assembly being disposed in the second housing member and including a track member and a two-directional motor; and also includes a wiper assembly being attached to the wiper drive assembly and including a wiper member being movable upon the mirror; and further includes a heating element being disposed in the first housing member; and also includes a light-emitting assembly also being disposed in the first housing member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rearview truck mirror and wiper assembly which has many of the advantages of the truck mirror and wiper assemblies mentioned heretofore and many novel features that result in a new rearview truck mirror and wiper assembly which is not anticipated, rendered obvious, suggested, or even implied by any of the prior art truck mirror and wiper assemblies, either alone or in any combination thereof.

It is another object of the present invention to provide a new rearview truck mirror and wiper assembly which may be easily and efficiently manufactured and marketed.

It is a further object of the present invention to provide a new rearview truck mirror and wiper assembly which is of a durable and reliable construction.

An even further object of the present invention is to provide a new rearview truck mirror and wiper assembly which is susceptible of a low cost of manufacture with regard to both materials and labor, and which accordingly is then susceptible of low prices of sale to the consuming public, thereby making such rearview truck mirror and wiper assembly economically available to the buying public.

Still yet another object of the present invention is to provide a new rearview truck mirror and wiper assembly which provides in the apparatuses and methods of the prior art some of the advantages thereof, while simultaneously overcoming some of the disadvantages normally associated therewith.

Still another object of the present invention is to provide a new rearview truck mirror and wiper assembly for improving the rear view for truckers by keeping the mirror clean and lighted.

Yet another object of the present invention is to provide a new rearview truck mirror and wiper assembly which includes a first housing assembly including a first housing member having side, top, bottom, and back walls, and also including an open front, and also including a mirror being securely disposed at the open front of the first housing member with the first housing assembly being adapted to be securely mounted to mirror supports on a truck; and also includes a second housing member being attached to the first housing member and having top, bottom, front and side walls; and further includes a wiper drive assembly being disposed in the second housing member and including a track member and a two-directional motor; and also includes a wiper assembly being attached to the wiper drive assembly and including a wiper member being movable upon the mirror; and further includes a heating element being disposed in the first housing member; and also includes a light-emitting assembly also being disposed in the first housing member.

Still yet another object of the present invention is to provide a new rearview truck mirror and wiper assembly that is easy and convenient to install and use.

Even still another object of the present invention is to provide a new rearview truck mirror and wiper assembly that improves road safety by improving the visibility of truckers when moving from one lane to the next.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
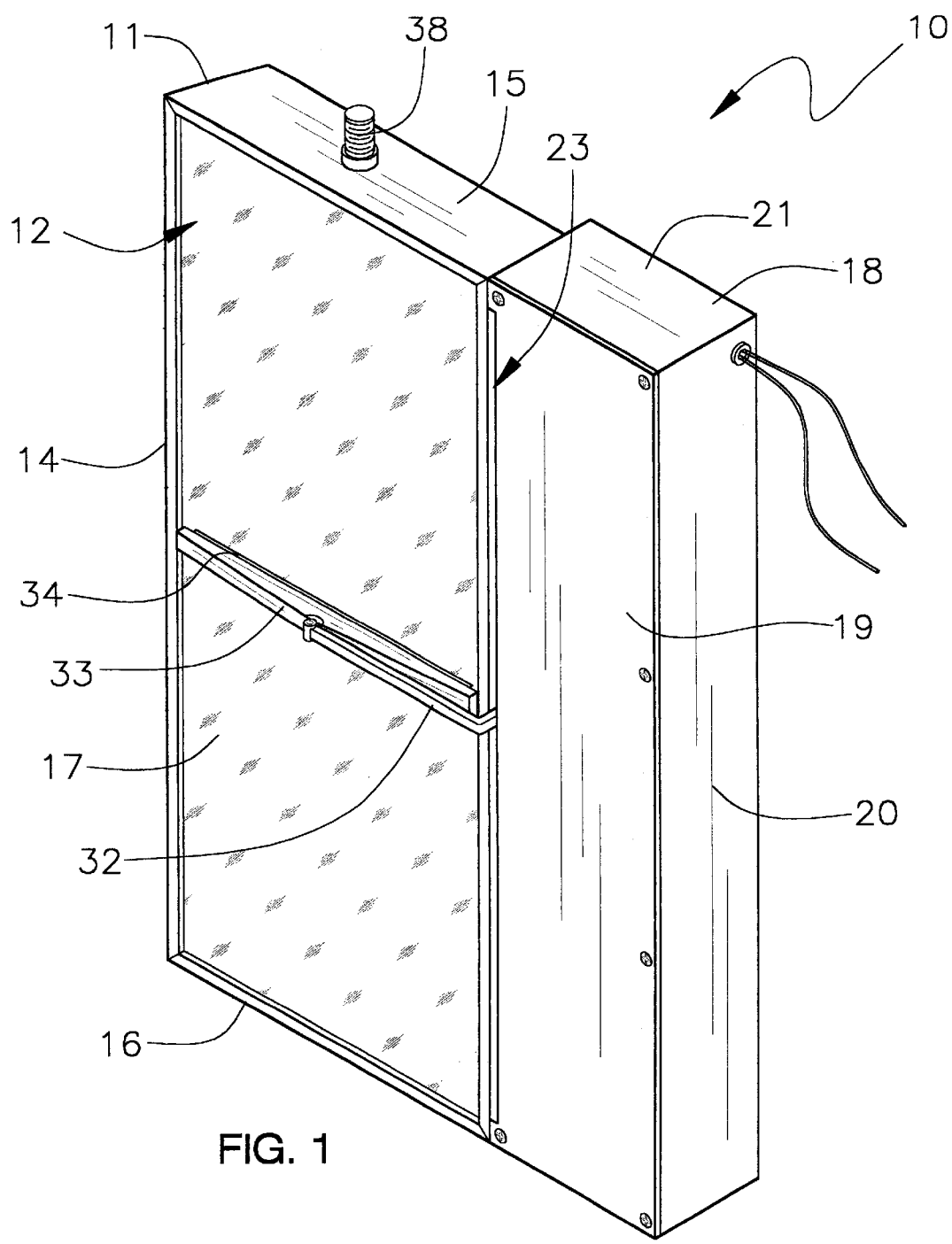
FIG. 1 is a perspective view of a new rearview truck mirror and wiper assembly according to the present invention.
Figure 2:
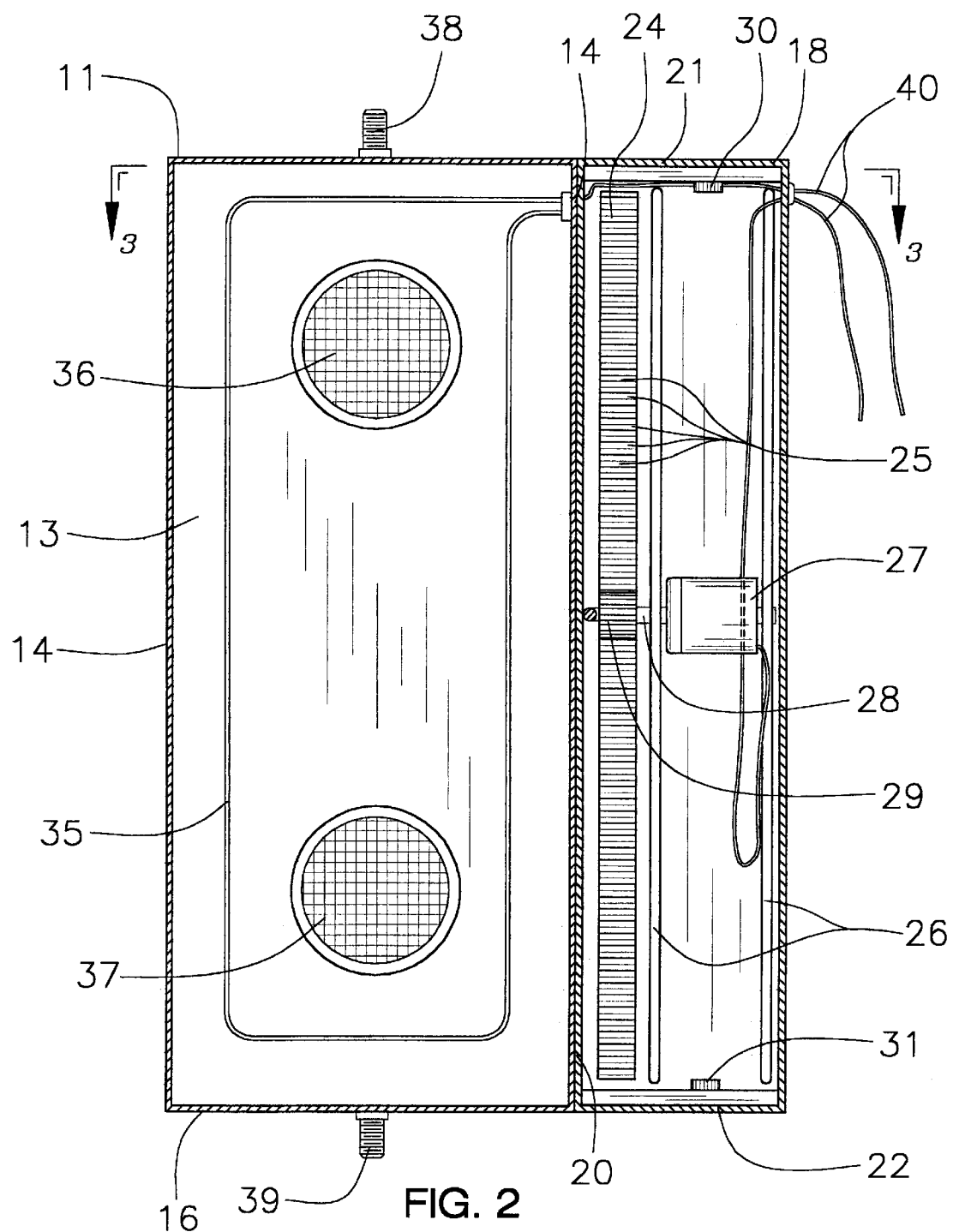
FIG. 2 is a front cross-sectional view of the present invention.
Figure 3:
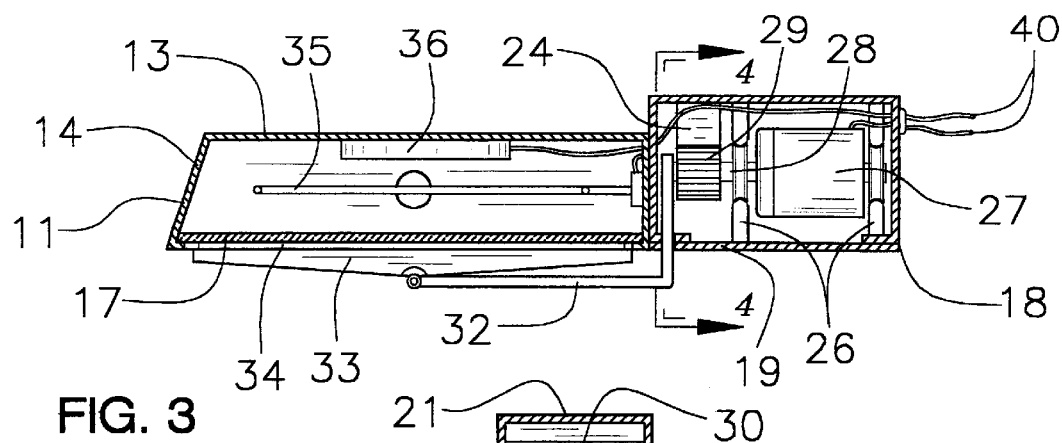
FIG. 3 is a top cross-sectional view of the present invention.
Figure 4:
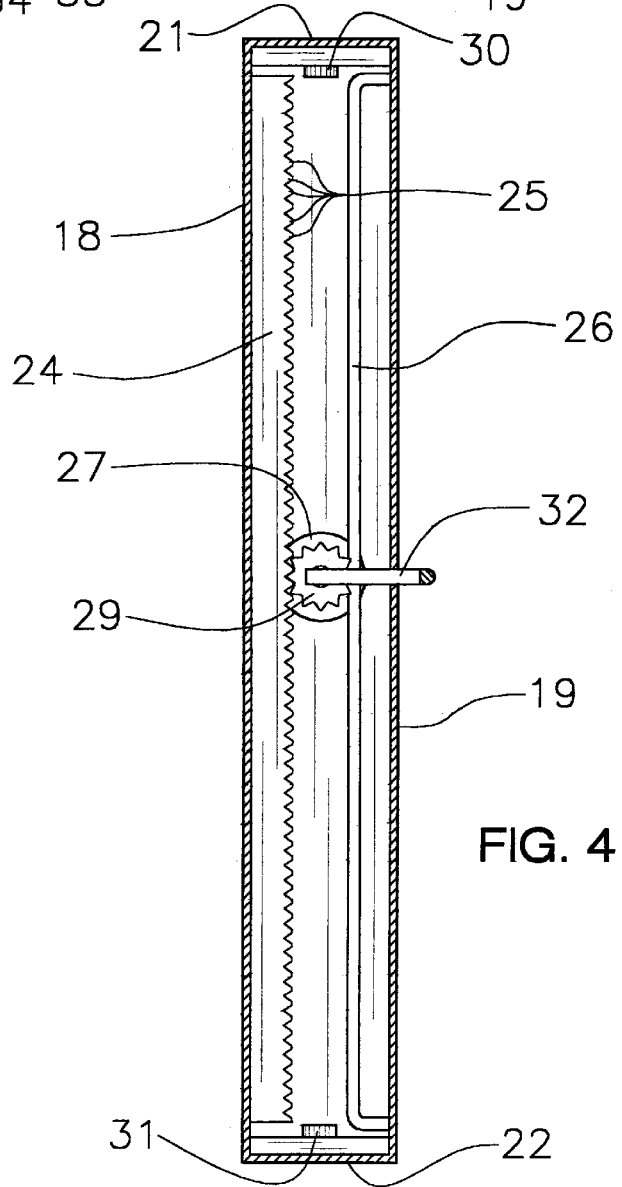
FIG. 4 is a side cross-sectional view of the present invention.

With reference now to the drawings, and in particular to FIGS. 1 through 4 thereof, a new rearview truck mirror and wiper assembly embodying the principles and concepts of the present invention and generally designated by the reference numeral 10 will be described.

As best illustrated in FIGS. 1 through 4, the rearview truck mirror and wiper assembly 10 generally comprises a first housing assembly including a first housing member 11 having side 14, top 15, bottom 16, and back walls 13, and also including an open front 12, and also including a mirror 17 being securely and conventionally disposed at the open front 12 of the first housing member 11. The first housing assembly is adapted to be securely mounted to mirror supports on a truck. The first housing assembly further includes fastening members 38,39 being conventionally attached to the top wall 15 and the bottom wall 16 of the first housing member 11 for mounting the first housing member 11 to the mirror supports of the truck.

A second housing member 18 is conventionally attached to the first housing member 11 and has top 21, bottom 22, front 19 and side walls 20. The second housing member 18 further includes a longitudinal slot 23 being disposed through the front wall 19 near one of the side walls 20 thereof and extend from near the top wall 21 to near the bottom wall 22 thereof. A wiper drive assembly is conventionally disposed in the second housing member 18 and includes a track member 24 and a two-directional motor 27. The track member 24 is conventionally attached to one of the walls in the second housing member 18 and extends from the top wall 21 to the bottom wall 22 of the second housing member 18 and includes a plurality of teeth 25 being conventionally disposed upon and along a length of the track member 24. The wiper drive assembly further includes a shaft 28 being rotatably mounted to the motor 27, and also includes a gear member 29 being conventionally attached to the shaft 28 and being engagable to the teeth 25 of the track member 24 and being movable along the length of the track member 24, and further includes contact switch members 30,31 being conventionally attached to the top and bottom walls 21,22 of the second housing member 18 and being connected with wires 40 to a power source and being in contactable relationship with the motor 27 for reversing direction of the motor 27, and also includes a pair of guide rail members 26 being securely and conventionally disposed in the second housing member 18 and upon which the motor 27 is movably supported.

A wiper assembly is conventionally attached to the wiper drive assembly and includes a wiper member 33,34 being movable upon the mirror 17. The wiper assembly further includes a wiper support member 32 being conventionally attached to the motor 27 for movement therewith and being extended through the longitudinal slot 23 of the second housing member 18. The wiper member 33,34 includes a wiper blade support member 33 being conventionally attached to the wiper support member 32 and being adapted to be connected to a washer fluid reservoir, and also includes a wiper blade member 34 being conventionally attached to the wiper blade support member 33 and being contactable to the mirror 17 for the cleaning thereof. A heating element 35 is conventionally disposed in the first housing member 11. The heating element 35 is connected to a power source with wires 40 for keeping the mirror 17 de-iced. A light-emitting assembly 36,37 is also conventionally disposed in the first housing member 11. The light-emitting assembly 36,37 includes light-emitting members 36,37 being conventionally attached to the back wall 13 in the first housing member 11 and being connected to a power source with wires 40.

In use, the user energizes the two-directional motor 27 which rotates the gear member 29 upon and along the track member 24 with the wiper blade member 34 being moved upon the mirror 17 for the cleaning thereof, and the light-emitting members 36,37 are energized which lights up the mirror 17 from behind thereof.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rearview truck mirror and wiper assembly comprising:
    a first housing assembly including a first housing member having side, top, bottom, and back walls, and also including an open front, and also including a mirror being securely disposed at said open front of said first housing member, said first housing assembly being adapted to be securely mounted to mirror supports on a truck;
    a second housing member being attached to said first housing member and having top, bottom, front and side walls;
    a wiper drive assembly being disposed in said second housing member and including a track member and a two-directional motor;
    a wiper assembly being attached to said wiper drive assembly and including a wiper member being movable upon said mirror;
    a heating element being disposed in said first housing member; and
    a light-emitting assembly also being disposed in said first housing member.

2. A rearview truck mirror and wiper assembly as described in claim 1, wherein said first housing assembly further includes fastening members being attached to said top wall and said bottom wall of said first housing member for mounting said first housing member to the mirror supports of the truck.

3. A rearview truck mirror and wiper assembly as described in claim 1, wherein said second housing member further includes a longitudinal slot being disposed through said front wall near one of said side walls thereof and extending from near said top wall to near said bottom wall thereof.

4. A rearview truck mirror and wiper assembly as described in claim 3, wherein said track member is attached to one of said walls in said second housing member, and extends from said top wall to said bottom wall of said second housing member, and includes a plurality of teeth being disposed upon and along a length of said track member.

5. A rearview truck mirror and wiper assembly as described in claim 4, wherein said wiper drive assembly further includes a shaft being rotatably mounted to said motor, and also includes a gear member being attached to said shaft and being engagable to said teeth of said track member and being movably along the length of said track member, and further includes contact switch members being attached to said top and bottom walls of said second housing member and being connected with wires to a power source and being in contactable relationship with said motor for reversing direction of said motor, and also includes guide rail members being securely disposed in said second housing member and upon which said motor is movably supported.

6. A rearview truck mirror and wiper assembly as described in claim 3, wherein said wiper assembly further includes a wiper support member being attached to said motor for movement therewith and being extended through said longitudinal slot of said second housing member, said wiper member including a wiper blade support member being attached to said wiper support member and being adapted to be connected to a washer fluid reservoir, and also including a wiper blade member being attached to said wiper blade support member and being contactable to said mirror for the cleaning thereof.

7. A rearview truck mirror and wiper assembly as described in claim 1, wherein said heating element is connected to a power source with wires for keeping said mirror de-iced.

8. A rearview truck mirror and wiper assembly as described in claim 1, wherein said light-emitting assembly includes light-emitting members being attached to said back wall in said first housing member and being connected to a power source with wires.

9. A rearview truck mirror and wiper assembly comprising:
    a first housing assembly including a first housing member having side, top, bottom, and back walls, and also including an open front, and also including a mirror being securely disposed at said open front of said first housing member, said first housing assembly being adapted to be securely mounted to mirror supports on a truck, said first housing assembly further including fastening members being attached to said top wall and said bottom wall of said first housing member for mounting said first housing member to the mirror supports of the truck;
    a second housing member being attached to said first housing member and having top, bottom, front and side walls, said second housing member further including a longitudinal slot being disposed through said front wall near one of said side walls thereof and extending from near said top wall to near said bottom wall thereof;
    a wiper drive assembly being disposed in said second housing member and including a track member and a two-directional motor, said track member being attached to one of said walls in said second housing member and extending from said top wall to said bottom wall of said second housing member and including a plurality of teeth being disposed upon and along a length of said track member, said wiper drive assembly further including a shaft being rotatably mounted to said motor, and also including a gear member being attached to said shaft and being engagable to said teeth of said track member and being movably along the length of said track member, and further including contact switch members being attached to said top and bottom walls of said second housing member and being connected with wires to a power source and being in contactable relationship with said motor for reversing direction of said motor, and also including guide rail members being securely disposed in said second housing member and upon which said motor is movably supported;

a wiper assembly being attached to said wiper drive assembly and including a wiper member being movable upon said mirror, said wiper assembly further including a wiper support member being attached to said motor for movement therewith and being extended through said longitudinal slot of said second housing member, said wiper member including a wiper blade support member being attached to said wiper support member and being adapted to be connected to a washer fluid reservoir, and also including a wiper blade member being attached to said wiper blade support member and being contactable to said mirror for the cleaning thereof;

a heating element being disposed in said first housing member, said heating element being connected to a power source with wires for keeping said mirror de-iced; and a light-emitting assembly also being disposed in said first housing member, said light-emitting assembly including light-emitting members being attached to said back wall in said first housing member and being connected to a power source with wires.

* * * * *